June 5, 1962 W. E. KNAPP ETAL 3,037,357
CABLE LAYERS

Filed Dec. 30, 1959 2 Sheets-Sheet 1

INVENTORS.
WILLIAM E. KNAPP
EDWIN F. WADELTON
BY
*C. T. Parker + R. C. Johnson*
ATTORNEYS June 5, 1962  W. E. KNAPP ETAL  3,037,357
CABLE LAYERS
Filed Dec. 30, 1959  2 Sheets-Sheet 2
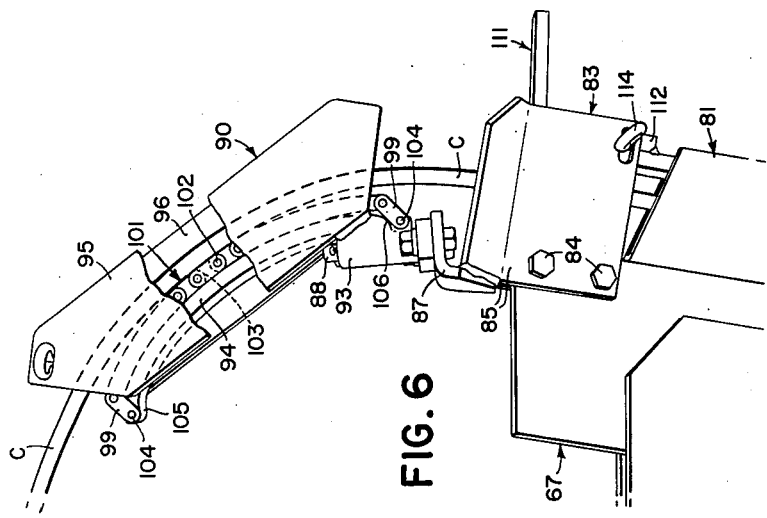
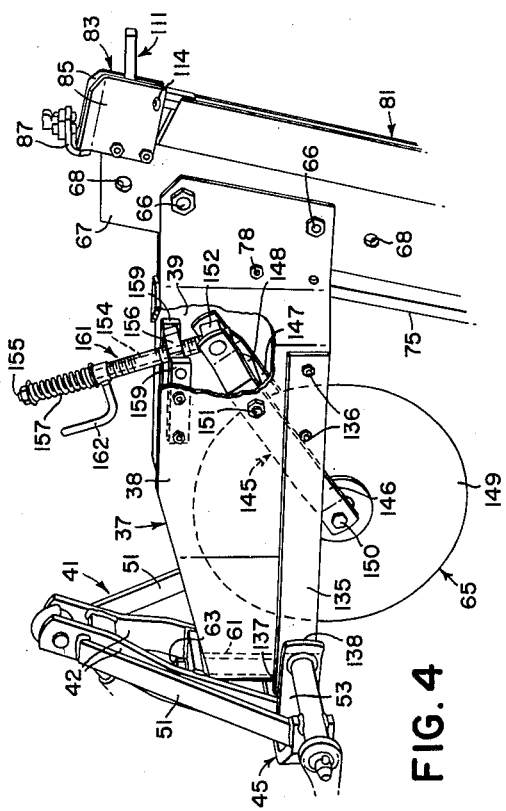
INVENTORS
WILLIAM E. KNAPP
EDWIN F. WADELTON
BY
ATTORNEYS

United States Patent Office 3,037,357
Patented June 5, 1962

3,037,357
CABLE LAYERS
William E. Knapp and Edwin F. Wadelton, Los Angeles, Calif., assignors to Deere & Company, Moline, Ill., a corporation of Delaware
Filed Dec. 30, 1959, Ser. No. 862,853
5 Claims. (Cl. 61—72.6)

This invention relates generally to cable or wire laying machines and more particularly to implements of this type that are particularly adapted to be connected to tractors having 3-point hitch linkage.

The object and general nature of this invention is the provision of a cable layer constructed and arranged to be attached to the 3-point linkage of a farm or industrial tractor and including a plow frame connected to a hitch frame for generally lateral swinging movement relative thereto about a generally vertical axis, whereby turning when the standard is in the ground is facilitated.

More specifically, it is a feature of this invention to provide a plow frame including laterally spaced plow frame plates between which a vertically adjustable and spring biased coulter is disposed, the coulter being arranged generally in the vertical fore-and-aft extending plane of the ground opening plow. Further, the coulter is spring loaded so as to cut trash or sod and still be adapted to rise over a hidden or buried obstacle without lifting the standard frame up and thereby vary the depth of the buried cable.

Still further, a feature of this invention is the provision of spring means acting against the laterally swingable plow frame for holding the latter in a centered position, particularly when raised for transport, but which is also adapted to yield, such as when the tractor departs from the straight forward line of travel, or in the case the plow and/or coulter should strike a submerged object. Another important feature of this invention is the provision of cable guide means provided with antifriction cable-engaging means in the form of relatively short sections of conventional roller chain, the rollers of the chain being disposed above the associated cable guide supporting surface so that the cable is guided by virtue of contact with the freely rotatable rollers of the chain section or sections. The use of sections of conventional roller chain makes it possible to provide an anti-friction cable guide without the necessity of providing special pivots and special rollers, such as are disclosed in the U. S. patent to Sjogren et al 2,254,324, issued September 2, 1941.

Further features of this invention include a reversible cable guide fixed to the rear edge of the standard, a generally vertically adjustable standard shiftable to accommodate either a shallow working position or a deep working position a top cable guide swingable about a generally vertical axis, and a cable support attachable to the blade of a front mounted dozer.

These and other objects and advantages of the present invention will be apparent to those skilled in the art after a consideration of the following detailed description, taken in conjunction with the accompanying drawings, in which:

FIG. 1 is a side view of the tractor-carried cable laying outfit in which the principles of this invention have been incorporated.

FIG. 2 is a fragmentary perspective view showing the hitch frame, with a portion of the tractor 3-point hitch linkage shown diagrammatically.

FIG. 3 is a perspective view of the reel mounting.

FIG. 4 is a fragmentary perspective view showing the pivotal connection of the plow frame with the hitch frame and other associated parts and the spring biased adjustable coulter mounting.

FIG. 5 is an enlarged elevation of the lower portion of the plow standard and the associated cable guide channel closure gate, with cable-receiving roller chain section.

FIG. 6 is a side view of the upper cable guide and swivel mounting carried at the upper end of the plow standard.

Referring first to FIG. 1, the cable laying outfit in which the principles of the present invention have been incorporated is illustrated as comprising a track-laying tractor 11 of generally conventional construction and provided with a bulldozer 12 carried at the forward end of the tractor and including a transverse blade 13 and a push frame 14, and a cable-laying plow implement 15 in which certain novel features of this invention have been embodied.

The implement unit 15 is connected with the rear portion of the tractor 11 by means of a 3-point linkage 16 that includes a pair of lower draft links 17 and an upper link 18, the links 17 and 18 being connected with the tractor for generally universal movement and the rear ends of the links 17 and 18 being connected with the cable-laying plow unit by universal joint connections that per se are of generally conventional construction. The outfit shown in FIG. 1 is particularly designed for laying insulated cable underground along roadways, through open fields, or the like. An outfit of this type is admirably adapted for use in laying telephone cables, which may be one inch or more in outside diameter and normally carried on a cable reel 21.

According to this invention, the cable reel 21 is supported at the front of the tractor 11 through a pair of triangular reel carriers 23, best shown in FIG. 3. Each reel carrier 23 includes a flanged plate 24 disposed in generally vertical longitudinally extending plane and each being provided at its rear end with the hook section 25 adapted to be engaged over the upper edge of the bulldozer blade 23. An extension 26 at the lower rear portion of each of the reel carrier plates 24 engages with the lower cutting edge of the blade and serves to hold the reel carriers in position. The reel carriers are provided with suitable sockets 27 in which a reel axle 28 is disposed, being held in position by suitable retainers, such as detachable pins 29. The cable reel 21 is carried on the reel axle 28 and held in position laterally by set screw collars 31 or other suitable means. A cable C extends rearwardly from the reel 21 through "pig tail" cable guides 33 supported on standards 34 carried in any suitable way by the tractor.

Referring now to FIGS. 1, 2 and 4, the cable-laying plow 15 of the present invention includes a plow frame 37 made up of right and left hand plow frame plates 38 and 39 and associated parts and a generally vertical hitch frame 41. The latter includes a pair of generally vertically disposed bars 42 suitably interconnected in laterally spaced apart relation by cross bars 43 and 44 and, at the lower end of the bars 42 by generally U-shaped horizontal member 45. Secured to the latter is a lower horizontal plate 46 that is apertured, as at 47, in line with an upper aperture 48 formed in the generally central portion of the cross bar 44. The apertures just mentioned form means receiving a generally vertical pivot 63 by which the plates 38 and 39 are connected with the hitch frame 41 for laterally swingable movement, as will be described in detail below. The hitch frame 41 also includes downwardly and laterally outwardly diverging reenforcing bars 51 that are secured at their upper ends, as by welding, to the upper portions of the bars 42 and at their lower ends to the rear and laterally outwardly disposed portions 52 of the U-shaped bar 45. Extending rearwardly from the generally central portion of the bar 45 is a pair of rearwardly extending bars 53 that at their rear ends are disposed laterally inwardly of the rear ends 52 of the U-shaped bar 45. The latter ends 52, and the ends of the rearwardly extending bars 53, are welded to axially spaced apart cross shaft sections 54, the outer ends of which are reduced as at 55, to form means receiving the rear ends of the associated lower draft links 17. The rearwardly extending bars 53 are also welded or otherwise fixed to the lower horizontal plate 46.

As mentioned above, the plow frame plates 38 and 39 are connected with the hitch frame 41 for laterally swinging movement about the generally vertical pivot 63. The forward end portions of the plow frame plates 38 and 39 are formed so as to converge forwardly and are welded to a vertical sleeve 61 that receives the generally vertical pivot structure 63 that is rigidly secured to the apertured members 44 and 46 of the hitch frame 41. The pivot means just described is of sufficient vertical extent that the plow frame plates 38 and 39 are rigid in a generally vertical direction with respect to the hitch frame structure 41.

The generally central portions of the hitch frame plates 38 and 39 are spaced apart to receive a coulter 65 therebetween (FIG. 4), and the rear ends of the plates 38 and 39 are shaped to extend toward one another and are apertured to receive a pair of bolts 66 by which the plates are rigidly secured in vertically adjusted position to a generally vertical standard 67. The latter has a plurality of openings 68 to selectively receive the bolts 66. The lower end of the standard 67 (FIG. 1) is welded to a pair of laterally spaced apart foot plates 71. The rear ends of the plates 71 extend rearwardly of the standard 67 and the forward ends of the plates 71 extend forwardly of the standard 67 and are welded to an angled apertured bar 72 to which a rounded furrow forming point 73 is connected, as by a pair of bolts or the like. The point 73 is rounded at its upper side to minimize lifting or heaving of the ground. A sharpened shin 75 is fixed in front of the forward edge of the standard 67 and is apertured at its upper end to receive a bolt 78 (FIG. 4) that connects the upper end of the shin 75 to the rear portions of the frame plates 38 and 39. The shin 75 is also apertured at its lower ends so that the shin 75 may be reversed end for end, which has the effect of providing a new sharp edge for soil engagement. It will be seen from FIG. 4 that the standard 67 is provided with two sets of openings, whereby the standard may be connected to the plates 38 and 39 in either of two optional vertical positions, thereby providing for a short position or a long position, the latter being provided for placing the cable at the deeper depth.

A standard guide member 81, U-shaped in cross section, is bolted to the rear edge of the standard 67 and forms a channel for receiving the cable C as the latter passes behind the standard 67 and into the space between the rear portions of the foot plates 71. A cable guide 83 is bolted, as at 84, to the upper end of the standard 67 and includes a pair of side plates 85 extending laterally outwardly and upwardly and serves to support, by means of an angled bracket 87, a generally vertical post 88. This post forms the pivot support for a swivelled cable guide 90 that receives the cable from the rear loop 33.

The upper swivelled cable guide 90 is of particular construction. As will best be seen in FIG. 6, the swivelled cable guide 90 comprises a lower vertical sleeve 93 secured, as by welding, to an upwardly and forwardly carried chain-receiving member 94 to which a pair of side plates 95 and 96 are secured, as by welding. The member 94 is apertured at its ends to receive the side links 99 at the ends of a roller chain section 101 as will best be seen in FIG. 6. The roller chain section 101 is of conventional roller chain construction, embodying, in addition to the side links 99, pivot means 102 interconnecting the side links 99 and serving as journal means receiving the rollers 103 (FIG. 5). The side links 99 have a width that exceeds the diameter of the associated rollers 103, so that when the chain section 101 is disposed in position, as shown in FIG. 6, the rollers 103 are supported for relatively free rotation above and out of contact with the curved surface or upper face of the roller chain supporting member 94. Thus, when the cable is fed down through the unit 90 and in between the side plates 95, the cable is supported by a plurality of closely spaced anti-friction means in the form of the chain rollers 103.

The roller chain section 101 is held in place by pins 104 extending to the inside links and through associated apertured bosses 105 and 106 carried at the ends of the arcuate member 94. As will best be seen from FIG. 6, the cable guide unit 90 is so constructed and mounted that the cable C feeds downwardly from the unit 90 into the channel formed by the standard guide member 81.

The rear opening of the channel member 81 is closed by a vertical guide or gate bar 111. This bar is similar to corresponding parts shown in U.S. Patent 2,441,153, issued May 11, 1948 to R. J. Kent but is provided with certain improvements that form a part of this invention. First, the upper end of the cable guide 111 is provided with a short block 112 (FIG. 5) that is welded to the adjacent face of the guide or gate 111. After the parts are welded together, an opening 113 is drilled therein to receive an attaching quick detachable pin 114. Secondly, the lower end portion of the channel-closing guide or gate 111 is provided with a curved offset portion 115 (FIG. 5) that receives a short section 117 of roller chain, that may be identical or substantially so with the chain section 101 described above. The lower portion of the guide or gate 111 is provided with an upper apertured lug 118 receiving a pin 119 by which the side links 121 of the chain section 117 are connected to the gate 111. The rearwardmost portion of the gate 111 is provided with a second apertured lug 120 that is adapted to receive a second pin 119 that fixes the lower end of the chain section 117 in position with the side links 121 of the chain resting on the lower downwardly and rearwardly curved face 123 of the lower gate portion, which supports the associated chain rollers in an arcuate series that lies out of contact with the curved surface 123, whereby the rollers are freely rotatable and serve as free running anti-friction means guiding the lowermost portion of the cable into the furrow opened by the plow point 73. Experience has shown that by the use of upper and lower chain sections, the force required to pull the cable from the reel in the arrangement constructed according to this invention is many times smaller than the force required to pull the cable over relatively fixed guides, such as those shown in the Kent patent.

The closure guide or gate 111 is mounted for ready detachability in the channel member 81. To this end, the lower portion of the gate member 111 carries a pair of opposed laterally outwardly extending studs 130 that are adapted to be disposed in notches 131 formed in the rear portion of the foot plates 71. The upper end of the gate 111 is apertured, as described above, so that simply by removing the pin 114 the gate 111 may simply and easily be lifted out from the channel member 81, thus freeing the cable for disconnection from the plow 15. It will be seen that the cable need not be severed to connect and disconnect the same from the plow 15.

Since the roller chain sections 101 and 117 are of conventional construction and are commercially available, the cost of the roller chain sections is many times less than the cost of special journal supports and anti-friction rollers that would have to be made special for the upper and lower cable guides of the type shown in the Sjogren et al. patent.

As mentioned above, the plow frame is connected with the hitch frame for lateral swinging about the vertical pivot 63. However, when the plow is raised for transport, it is desirable to hold the plow unit in a centered position. To this end, we provide a pair of leaf springs 135 that are bolted, as at 136, to the associated side plates 38 and 39, well toward the rear of the plow frame. Each spring member 135 is so formed that the forward end 137 extends or lies laterally outwardly away from the associated plow frame plate. The ends 137 are disposed between the rear portions of the bars 53 and are curved or bent at their forward ends to cooperate with the rear curved or bent portions, indicated at 138, of the rear ends of the bars 53. The action of the springs 135 is to hold the plow frame in generally centered position, but if the direction of travel of the tractor changes, the plow frame is free to swing laterally to accommodate such change, one or the other of the springs 135 yielding to accommodate such movement. In transport, the springs 135 hold the plow against lateral swinging.

The coulter construction 65 is best shown in FIG. 4 and includes a coulter support lever 145 that comprises two lever arms 146 and 147 rigidly interconnected by a cross sleeve 148 welded thereto. A coulter blade 149 is journaled as at 150 between the lower forward ends of the arms 146 and 147 and a pivot bolt 151 swingably mounts the support lever 145 on the frame plates 38 and 39. The ends of the lever arms 146 and 147 opposite the coulter journal 150 are apertured to receive a trunnion block 152 that is apertured to receive the head end of a long bolt 154 the upper end of which is threaded to receive an adjusting nut 155. A biasing spring 157 is disposed between the nut 155 and an elongated exteriorly threaded member 161 trunnioned in a nut member 156 carried by a pair of support bars 159 bolted to the inside faces of the adjacent portions of the frame plates 38 and 39. The adjusting member 161 carries a handle 162 so that by turning the member 161 the coulter blade 149 may be raised or lowered, as desired, but in any position the yielding of the spring 157 permits the coulter to raise and pass over obstructions without raising the cable furrow-opening shoe.

The lower bolt 66 (FIG. 4) may take the form of a shear pin so that the standard 67 may swing upwardly and rearwardly if the lower shoe should hook under a rock or other obstacle. In that case, the cable guide 90 is provided with a horizontal pivot so that if an interference is encountered between the top guide 90 and the coulter adjusting crank, the top guide will pivot rearward relative to the standard when the shear bolt fails, resulting in forward movement of the top guide 90.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A cable plow adapted to be mounted on the rear portion of a tractor having a three-point linkage, said plow comprising a hitch frame having an upper and lower link-receiving means, a plow frame mounted to the rear of the hitch frame and having a forward portion connected for lateral swinging movement with the hitch frame, and centering spring means acting between said plow frame and said hitch frame and serving to keep the plow frame generally in a central position behind the hitch frame, said centering means comprising a pair of generally flat springs disposed in a generally fore-and-aft position and fixed at their aft end portions to the plow frame, and means on the hitch frame receiving the forward end portions of said springs.

2. The invention set forth in claim 1, further characterized by the forward end portions of said springs being curved.

3. A cable plow adapted to be mounted on a tractor having a three-point linkage, said plow comprising a hitch frame having an upper link-receiving means and a pair of laterally spaced apart lower link-receiving means, a plow frame having a forward portion connected for lateral swinging movement with the hitch frame generally between said lower link-receiving means, the plow having a generally vertical standard having at its rear portion a cable-receiving channel, and centering spring means acting between said plow frame and said hitch frame and serving to keep the standard generally in a centered position behind the hitch frame.

4. A cable plow adapted to be mounted on a tractor having a three-point linkage, said plow comprising a hitch frame having an upper link-receiving means and a pair of laterally spaced apart lower link-receiving means, a plow frame having a forward portion connected with said hitch frame and including a pair of generally vertical laterally spaced apart plates, the plow having a generally vertical standard fixed between the rear portions of said plates and having at its rear portion a cable-receiving channel, and a generally vertical coulter disposed between and connected with said plates and disposed forwardly of and in the generally fore-and-aft extending vertical plane of said standard.

5. The invention set forth in claim 4, further characterized by a coulter support pivoted to and disposed between said plates, means journaling said coulter on said coulter support, and spring biased means connected to act between said plates and said coulter support for yieldably holding said coulter in a selected vertically adjusted position.

References Cited in the file of this patent

UNITED STATES PATENTS

| 2,441,153 | Kent | May 11, 1948 |
| 2,738,955 | Francis | Mar. 20, 1956 |
| 2,756,655 | Kincaide | July 31, 1956 |
| 2,783,025 | Scheidt | Feb. 26, 1957 |
| 2,790,366 | McKinzie | Apr. 30, 1957 |
| 2,888,996 | Ralston | June 2, 1959 |
| 2,900,931 | Lisle | Aug. 25, 1959 |

FOREIGN PATENTS

| 823,816 | Germany | Dec. 6, 1951 |
| 82,508 | Norway | Sept. 28, 1953 |
| 122,589 | Sweden | Aug. 31, 1948 |

OTHER REFERENCES

"Operator's Manual OM-K57-1258, John Deere 230 Cable Layer" published by Deere and Company (Moline, Ill.), before January 27, 1959. Twenty pages plus four cover pages.